United States Patent
Yamazaki et al.

(10) Patent No.: US 8,737,180 B2
(45) Date of Patent: May 27, 2014

(54) OPTICAL PICKUP DEVICE AND OPTICAL DISC APPARATUS FOR RECORDING AND REPRODUCING INFORMATION ON AND FROM OPTICAL DISC INCLUDING PLURALITY OF RECORDING LAYERS

(75) Inventors: Kazuyoshi Yamazaki, Yamato (JP); Daisuke Tomita, Yokohama (JP)

(73) Assignee: Hitachi Media Electronics Co., Ltd., Kanagawa (JP)

( * ) Notice: Subject to any disclaimer, the term of this patent is extended or adjusted under 35 U.S.C. 154(b) by 0 days.

(21) Appl. No.: 13/597,787

(22) Filed: Aug. 29, 2012

(65) Prior Publication Data
US 2013/0229898 A1  Sep. 5, 2013

(30) Foreign Application Priority Data
Mar. 2, 2012 (JP) .................. 2012-046702

(51) Int. Cl.
*G11B 7/00* (2006.01)
(52) U.S. Cl.
USPC .................. 369/44.37; 369/112.01
(58) Field of Classification Search
None
See application file for complete search history.

(56) References Cited

U.S. PATENT DOCUMENTS

| | | | |
|---|---|---|---|
| 6,798,723 B2 | 9/2004 | Hayashi et al. | |
| 7,965,594 B2 | 6/2011 | Nakamura et al. | |
| 2008/0198730 A1* | 8/2008 | Mori et al. | 369/112.23 |
| 2010/0046340 A1* | 2/2010 | Nishiyama | 369/53.17 |
| 2011/0026382 A1* | 2/2011 | Kanai et al. | 369/47.14 |
| 2011/0182159 A1* | 7/2011 | Kita et al. | 369/44.23 |

FOREIGN PATENT DOCUMENTS

| | | |
|---|---|---|
| JP | 2004-281026 | 10/2004 |
| JP | 2006-344344 | 12/2006 |

OTHER PUBLICATIONS

Kousei Sano, et al., Novel One-beam Tracking Detection Method for Dual-Layer Blu-ray Discs, The Institute of Electronics information and Communication Engineers, IEICE Technical Report CPM2005-149 (Oct. 2005).

* cited by examiner

*Primary Examiner* — Paul Huber
(74) *Attorney, Agent, or Firm* — Antonelli, Terry, Stout & Kraus, LLP.

(57) ABSTRACT

Provided is an optical pickup device that suppresses a fluctuation of a tracking error signal caused by stray light when recording/reproducing information on/from an optical disc including a plurality of recording layers and attains size reduction. It includes a laser diode emitting laser light of about 405 nm in wavelength, an objective lens irradiating the optical disc with an optical beam emitted from the laser diode and having a numerical aperture of about 0.85, and a detector including a detection part receiving the optical beam reflected from the optical disc. An optical magnification from the optical disc to the detector is set within a range from about 10× to 15×.

14 Claims, 7 Drawing Sheets

OPTICAL PICKUP DEVICE AND OPTICAL DISC APPARATUS FOR RECORDING AND REPRODUCING INFORMATION ON AND FROM OPTICAL DISC INCLUDING PLURALITY OF RECORDING LAYERS

CLAIM OF PRIORITY

The present application claims priority from Japanese patent application serial no. JP 2012-046702, filed on Mar. 2, 2012, the content of which is hereby incorporated by reference into this application.

BACKGROUND OF THE INVENTION (1) Field of the Invention

The present invention relates to an optical pickup device that favorably records and reproduces information on and from an optical disc that includes a plurality of recording layers and an optical disc apparatus loaded with the above optical pickup device.

(2) Description of the Related Art

Development of an optical disc that includes a plurality of recording layers (a multilayer disc) and an optical disc apparatus corresponding to the above disc is now being promoted in order to increase the storage capacity of the optical disc. Since light (stray light) reflected from recording layers other than a target layer is present in the multilayer disc, how a signal is recorded on the target layer and reproduced from the target layer with accuracy arises as a subject.

For example, in Japanese Patent Application Laid-Open No. 2006-344344 (FIG. 3 and FIG. 5), there is described a configuration that "an optical beam of P-polarized light which has been emitted from a light source unit 51 is reflected by an optical disc 15 and is incident upon a lens 61 as S-polarized light. Then, in both of quarter wave plates 62 and 63, an optical phase difference of a plus quarter wave is given to the optical beam which has been incident upon the plus X side of an optical axis and an optical phase difference of a minus quarter wave is given to the optical beam which has been incident upon the minus X side thereof. Thus, signal light that passes through the quarter wave plate 63 turns to S-polarized light and stray light turns to P-polarized light, and then only the signal light transmits through a polarization optical element 64", by presenting that "a desired signal is acquired from the optical disc that includes a plurality of recording layers with accuracy" as a subject to be solved, as a technology relating to the above.

In addition, in Technical Report CPM 2005-149, October 2005, p. 33, published from the Institute of Electronics, Information and Communication Engineers, there is described a configuration that "a photodetector for tracking is disposed in a region with no other-layer stray light", by presenting that "In recording/reproducing information on/from a dual layer disc, when other-layer stray light which is light reflected from layers other than a target layer is incident upon the photodetector, offset occurs in a TE signal. Thus, in an existing configuration that no countermeasure is taken to the other-layer stray light, the offset of the TE signal is increased in the dual layer disc as compared with that in a single layer disc and hence stable control is disturbed" as a subject to be solved. A configuration which is similar to the above is described in Japanese Patent Application Laid-Open No. 2004-281026 (FIG. 22, FIG. 24 and FIG. 25).

SUMMARY OF THE INVENTION

In general, in an optical pickup device, an objective lens is displaced in a focusing direction by detecting a focusing error signal to perform adjustment in the focusing direction and the objective lens is displaced in a radius direction of an optical disc by detecting a tracking error signal to perform tracking adjustment in order to correctly direct a light spot (a spot of light) onto a predetermined recording track in the optical disc. The position of the objective lens is controlled with these servo signals.

In case of a multilayer disc, stray light reflected from recording layers (other layers) other than a target layer is incident upon a detection part which is the same as that upon which signal light reflected from the target layer is incident. When the signal light and the stray light are incident upon the same detection part, such a disadvantage may occur that these two rays of light interfere with each other and a fluctuation component which is generated under the influence of the stray light is detected as the tracking error signal.

When a fluctuation amount of the tracking error signal is increased, tracking control becomes unstable and hence recording/reproducing performance may be deteriorated. Then, when the fluctuation amount is further increased, it becomes difficult to perform tracking control itself. Thus, in an optical pickup device and an optical disc apparatus, it becomes desirable to suppress the fluctuation of the tracking error signal caused by interference occurred in the multilayer disc. Japanese Patent Application Laid-Open No. 2006-344344 is configured such that an optical beam reflected from the optical disc is converged by a condenser lens, and light which has been expanded through the two quarter wave plates and a polarization optical element is converged by the condenser lens and is radiated to a detector. Although the signal light is separated from the stray light by the above mentioned configuration, it still has such a subject to be solved that an optical system for detection is complicated, its size is increased and hence the cost involved is increased.

Technical Report CPM 2005-149, October 2005, p. 33, published from the Institute of Electronics, Information and Communication Engineers (Japanese Patent Application Laid-Open No. 2004-281026) is configured such that a detector for tracking is disposed on the outer side of the stray light reflected from the other layers in the focusing optical beam which is generated around the focusing detector and light which has been diffracted at a central part of a hologram element is directed toward the outer side of the stray light reflected from the other layers. Although influence of the stray light is avoided by the above mentioned configuration, it still has such a subject to be solved that an increase in size of the detector leads to increases in size and cost of the optical pickup device.

The present invention aims to provide an optical pickup device that suppresses fluctuation of a tracking error signal under the influence of stray light when recording and reproducing information on and from an optical disc that includes a plurality of recording layers and attains size reduction and an optical disc apparatus loaded with the above mentioned optical pickup device.

An optical pickup device according to one embodiment of the present invention includes a laser diode emitting laser light of about 405 nm in wavelength, an objective lens irradiating the optical disc with an optical beam emitted from the laser diode and having a numerical aperture of about 0.85 and a detector including a detection part receiving the optical beam reflected from the optical disc, wherein an optical magnification from the optical disc to the detector is set within a range from about 10× to 15×.

An optical pickup device according to another embodiment of the present invention includes a laser diode emitting laser light of about 405 nm in wavelength, a grating branching an optical beam emitted from the laser diode into at least a main beam and two sub beams, an objective lens irradiating the optical disc with the optical beams branched by the grating and having a numerical aperture of about 0.85 and a detector including a detection part receiving the optical beam reflected from the optical disc, wherein the detector includes detection parts respectively receiving the main beam and the two sub beams, a light shielding zone that extends in a radius direction of the disc to shield incident light across a predetermined width is installed on a central part of each of the two detection parts that detect the two sub beams and an optical magnification from the optical disc to the detector is set within a range from about 8× to 15×.

According to the present invention, there is provided the optical pickup device that reduces fluctuation of a servo signal under the influence of the stray light when recording/reproducing information on/from the optical disc that includes the plurality of recording layers and attains size reduction. In addition, the recording/reproducing performance of an optical disc apparatus is stabilized owing to the above.

DETAILED DESCRIPTION OF THE PREFERRED EMBODIMENTS

Next, preferred embodiments of the present invention will be described with reference to the accompanying drawings.

Embodiment 1

Figure 1:
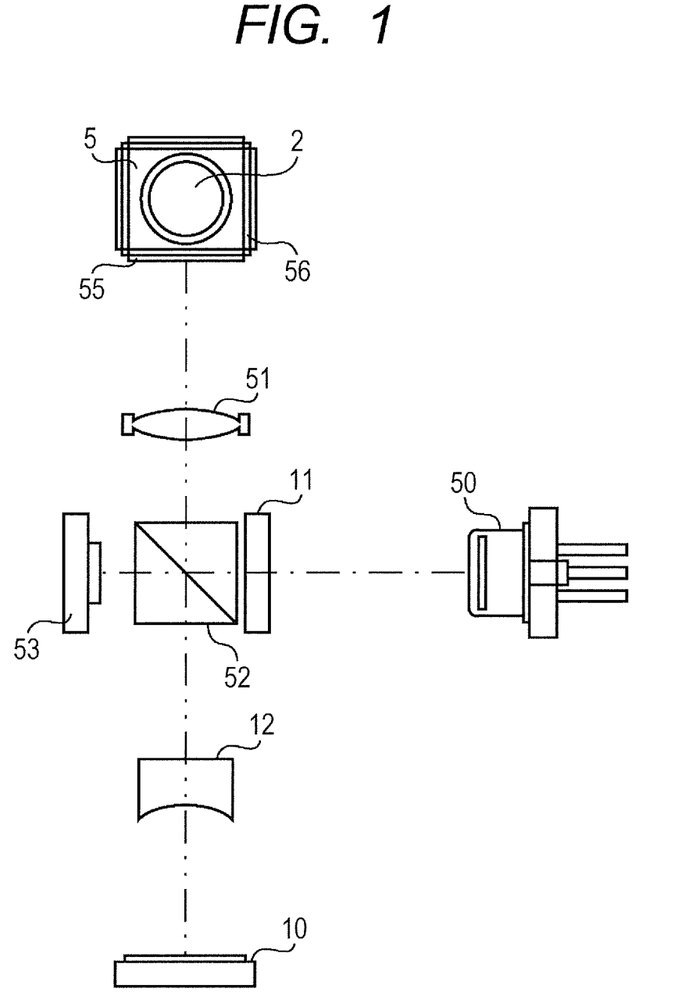
FIG. 1 is a diagram illustrating an example of an optical system of an optical pickup device according to an embodiment 1.

FIG. 1 illustrates a configuration example of an optical system of an optical pickup device according to an embodiment 1 of the present invention. In the embodiment 1, a dual layer BD (Blu-ray Disc) is conceived as an optical disc used.

An optical beam of about 405 nm in wavelength for use in the BD emits from a laser diode 50 as divergent light. The optical beam that has emitted from the laser diode 50 is incident upon a grating 11 and is branched into at least three optical beams of zero-order diffracted light (a main beam) and plus/minus first order diffracted light (sub beams). The optical beams that have exited from the grating 11 are reflected from a beam splitter 52. Incidentally, some optical beams are incident upon a front monitor 53 passing through the beam splitter 52. The optical beams reflected from the beam splitter 52 are converted into almost collimated optical beams by a collimating lens 51. Incidentally, the collimating lens 51 has a mechanism that drives in an optical axis direction and the mechanism is used to change a divergent/convergent state of the optical beams incident upon an objective lens 2 to compensate for spherical aberration caused by an error in thickness of a cover layer of the optical disc by driving the collimating lens 51 in the optical axis direction. The optical beams that have exited from the collimating lens 51 are condensed on the optical disc by the objective lens 2 which is loaded on an actuator 5 through a reflection mirror 55 and a quarter wave plate 56. Incidentally, the main beam and the two sub beams so condensed on the optical disc are arranged in a radius direction (Rad direction) of the disc at ½ track pitch intervals with the main beam positioned at the center.

The optical beams which have been reflected from the optical disc are incident upon a detector 10 through the objective lens 2, the quarter wave plate 56, the reflection mirror 55, the collimating lens 51, the beam splitter 52, and a detecting lens 12. Astigmatism is given to the optical beams by the detecting lens 12, by which a focusing error signal which is generated by an astigmatic method is detected.

Figure 2:
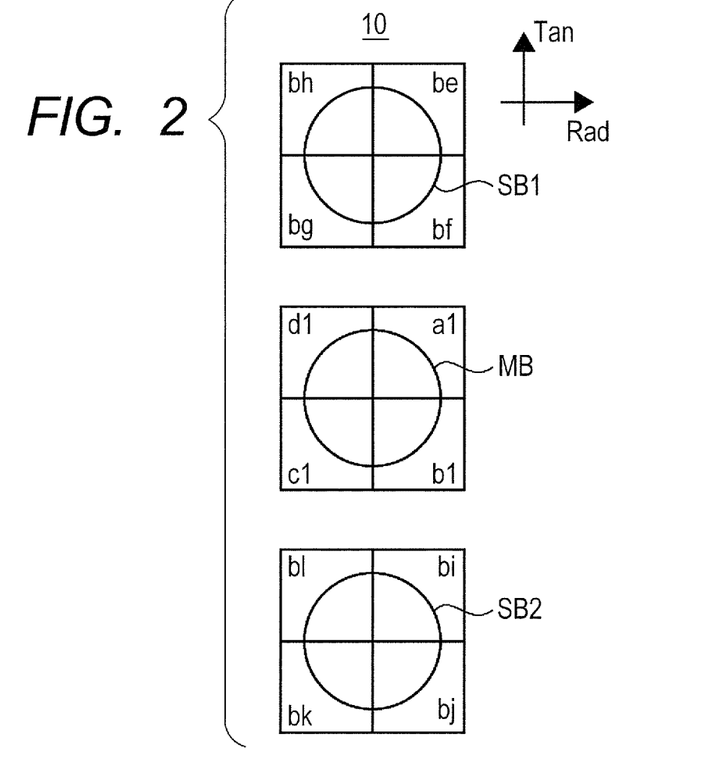
FIG. 2 is a diagram illustrating examples of relations between a detection part of a detector and signal light.

FIG. 2 illustrates examples of relations between a detection part of the detector 10 and signal light. Since astigmatism is given to the signal light by the detecting lens 12, the two sub beams rotate 90 degrees relative to the main beam on the detection part and are incident upon the detector deviating in a tangential direction of the disc.

The main beam MB (the zero-order diffracted light) so branched through the grating 11 is incident upon four divided detection part regions a1, b1, c1 and d1, the first sub beam SB1 (the plus first order diffracted light) is incident upon four divided detection part regions be, bf, bg and bh, and the second sub beam SB2 (the minus first order diffracted light) is incident upon four divided detection part regions bi, bj, bk and bl.

Then, assuming that A1, B1, C1, D1, BE, BF, BG, BH, BI, BJ, BK and BL respectively denote signals obtained from the regions a1, b1, c1, d1, be, bf, bg, bh, bi, bj, bk and bl, an RF (Radio Frequency) signal (RF), a tracking error signal (TES) and a focusing error signal (FES) are generated by the following arithmetic expressions (1).

$$\begin{aligned}RF &= A1 + B1 + C1 + D1\\TES &= \{(A1+D1)-(B1+C1)\} - ktb \times\\&\quad [\{(BE+BH)+(BI+BL)\} -\\&\quad \{(BF+BG)+(BJ+BK)\}]\\FES &= (A1+C1)-(B1+D1)\end{aligned} \quad (1)$$

The tracking error signal (TES) is of the type generated by a DPP (Differential-Push-Pull) method and the coefficient ktb is set so as not to generate a DC component in the tracking error signal when the objective lens is displaced. Alternatively, the focusing error signal (FES) may be generated by the following arithmetic expression (2)

$$FES = \{(A1+C1)-(B1+D1)\} + \quad (2)$$
$$kfb \times [\{(BE+BG)+(BI+BK)\}-\{(BF+BH)+(BJ+BL)\}]$$

Incidentally, kfb is the coefficient for correcting a difference in quantity of light between the zero order diffracted light and the plus/minus diffracted light so diffracted by the grating 11. It is allowed to suppress generation of a track crossing signal of the focusing error signal by performing arithmetic operations as mentioned above.

The optical pickup device according to the embodiment 1 is configured such that an optical magnification (hereinafter, referred to as the optical magnification from disc to detector) of the optical system on a return trip from the optical disc to the detector 10 is made greatly smaller than an existing optical magnification from disc to detector of the BD. The optical magnification from disc to detector according to the embodiment 1 is determined from a focal distance fo of the objective lens 2, a focal distance fd of the detecting lens 12, a focal distance fc of the collimating lens 51 and a space between the detecting lens 12 and the collimating lens 51. Specifically, the focal distance fd (curvature, refractive index and thickness) of the detecting lens 12 is changed in order to change the optical magnification from disc to detector.

In an existing optical pickup device, the optical magnification from disc to detector is about 20× to 24×. This optical magnification from disc to detector depends on the size of a four-divided detection part which is loaded on the optical pickup device conforming to standards. Here, the existing detection part has a square form whose side is about 100 to 120 μm. The reason therefor lies in that when the area of the detection part is too small, it may become unavoidable to make the diameter of a light spot on the detection part small accordingly and positional displacement of the detector or the like may occur. On the other hand, the too large area of the detection part may increase noise to deteriorate its reproducing performance. Therefore, the above mentioned value is optimum for the existing detection part and as a result of which the optical magnification from disc to detector is increased to about 20× to 24×. On the other hand, in the embodiment 1, the optical magnification from disc to detector is greatly reduced. Thus, more stable detection of the tracking error signal than ever is allowed as described hereinbelow.

Next, an effect of suppressing the fluctuation of the tracking error signal in the embodiment 1 will be described.

Figure 3:
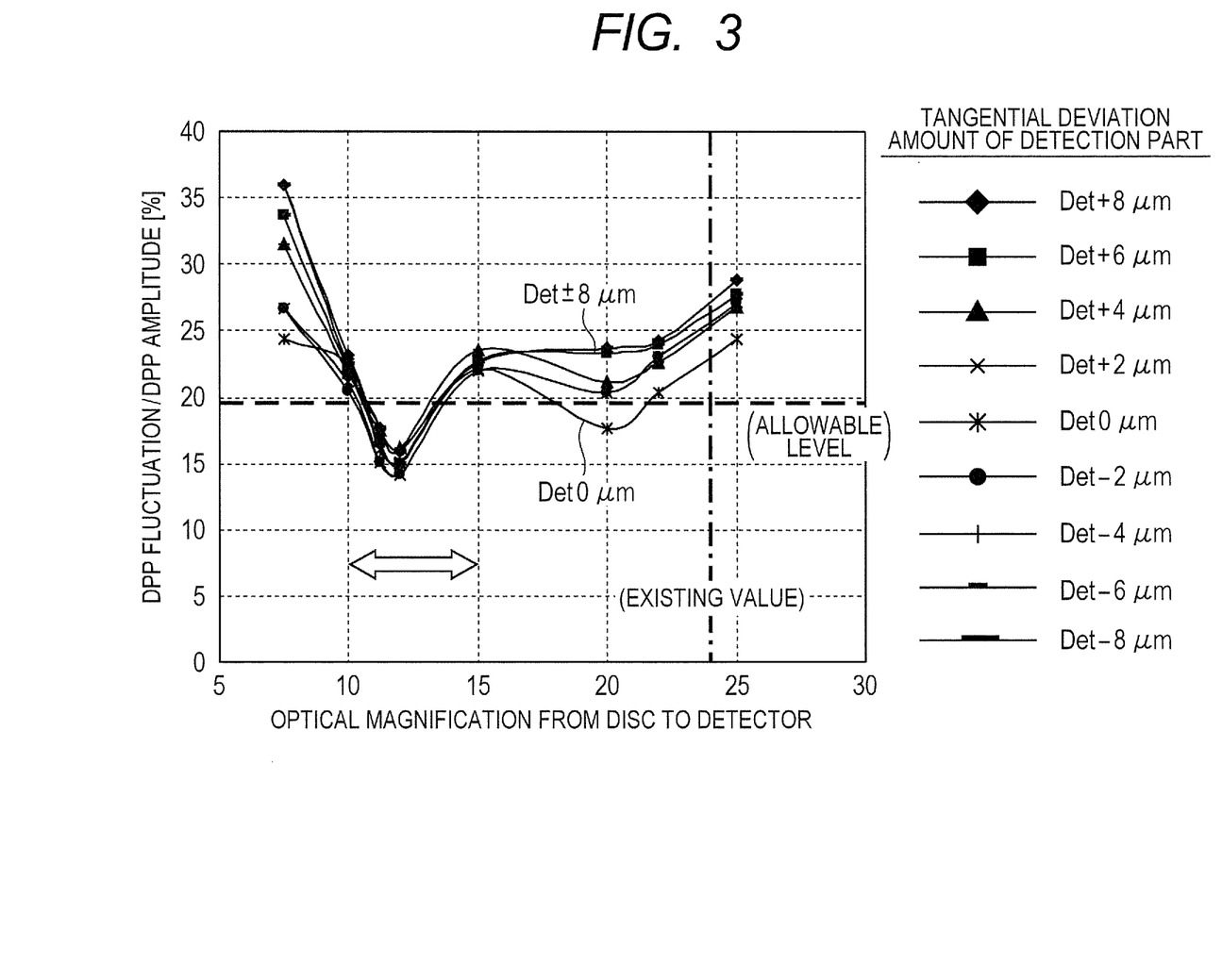
FIG. 3 is a diagram illustrating an example of dependency of a fluctuation amount of a tracking error signal on an optical magnification from disc to detector.

FIG. 3 is a diagram illustrating an example of dependency of the fluctuation amount of the tracking error signal on the optical magnification from disc to detector. That is, it illustrates an example of a result of simulation of a relation between the fluctuation amount of a Differential-Push-Pull (DPP) signal, that is, the tracking error signal and the optical magnification from disc to detectors in information reproduction from a Layer 0 of the dual layer disc. The fluctuation amount of the Differential-Push-Pull (DDP) signal is indicated as a value which is standardized with the amplitude of the Differential-Push-Pull (DPP) signal. In addition, the fluctuation amount of the Differential-Push-Pull (DPP) signal is indicated as the worst value obtained within a range from −0.2 to +0.2 mm in displacement amount of the objective lens in the radius direction of the disc in consideration of a condition under which it will be actually used. Further, symbols Det+8 μm to Det−8 μm denote the fluctuation amounts obtained when the detection part illustrated in FIG. 2 is deviated within a range from +8 μm to −8 μm in a tangential (Tan) direction in consideration of a variation in adjustment of the detector. In this simulation, calculations were performed using optical parameters in Table 1.

TABLE 1

| Optical Parameters for Simulation (Embodiment 1) | |
| --- | --- |
| Laser Wavelength | 405 nm |
| Diffraction Efficiency of Grating 11 | (Zero-Order Diffracted light): (Plus/Minus First Order Diffracted Light) = 15:1 |

TABLE 1-continued

| Optical Parameters for Simulation (Embodiment 1) | |
| --- | --- |
| Reflectance of Disc | (Reflectance of Layer 0)/ (Reflectance of Layer 1) = 1 |
| Focal Distance of Objective Lens | 1.76 mm |
| Numerical Aperture (NA) | 0.85 |
| Diameter of Light Spot on Detection Part of Detector | 60 μm |
| Size of Detection Part of Detector | 120 μm × 120 μm |
| Space between Detection Parts (Distance between Main and Sub Beams) of Detector | 153 μm |

In addition, when the optical magnification from disc to detector is changed, the grating pitch of the grating 11 is changed to adjust such that the sub beams SB1 and SB2 are incident upon the detection parts for sub beams and to change the amount of astigmatism of the detecting lens 12 such that the light spot of the same size as the previous one is directed onto the detector 10.

The optical magnification from disc to detector of a reference optical system which is configured based on the existing standards is about 24× as described above. However, it is found from the result illustrated in FIG. 3 that the fluctuation of the tracking error signal is decreased with making the optical magnification from disc to detector smaller than the value of the reference optical system based on the existing standards. Here, a permissible value of the fluctuation amount of the tracking error signal is taken into consideration. In the BD, it is desirable that a de-tracking amount when following a predetermined track be not more than 20 nm. Thus, it is desirable that the offset amount relative to the amplitude of the Differential-Push-Pull (DPP) signal be not more than 19.2% in the waveform of the tracking error signal. Assuming that the fluctuation of the tracking error signal occurs on one side, the permissible value of the fluctuation amount will be not more than 19.2% (indicated by a broken line in the drawing) and the optimum optical magnification from disc to detector at that time will be about 10.5× to 13.5×. However, it is desirable that an amount of error in servo control which would occur in the optical disc apparatus and the like be taken into consideration in determination of the actual permissible value of the fluctuation amount. In other words, judging from a different viewpoint, it may be good enough to set the optical magnification from disc to detector within a range (indicated by an arrow) from about 10× to 15× in order to obtain the effect of suppressing the fluctuation amount of the tracking error signal in comparison with the condition (the optical magnification from disc to detector: 24×) of the existing optical system.

Here, reasons for occurrence of the effect of the embodiment 1 will be considered. First, fluctuation of the tracking error signal caused by interference will be described.

Figure 4:
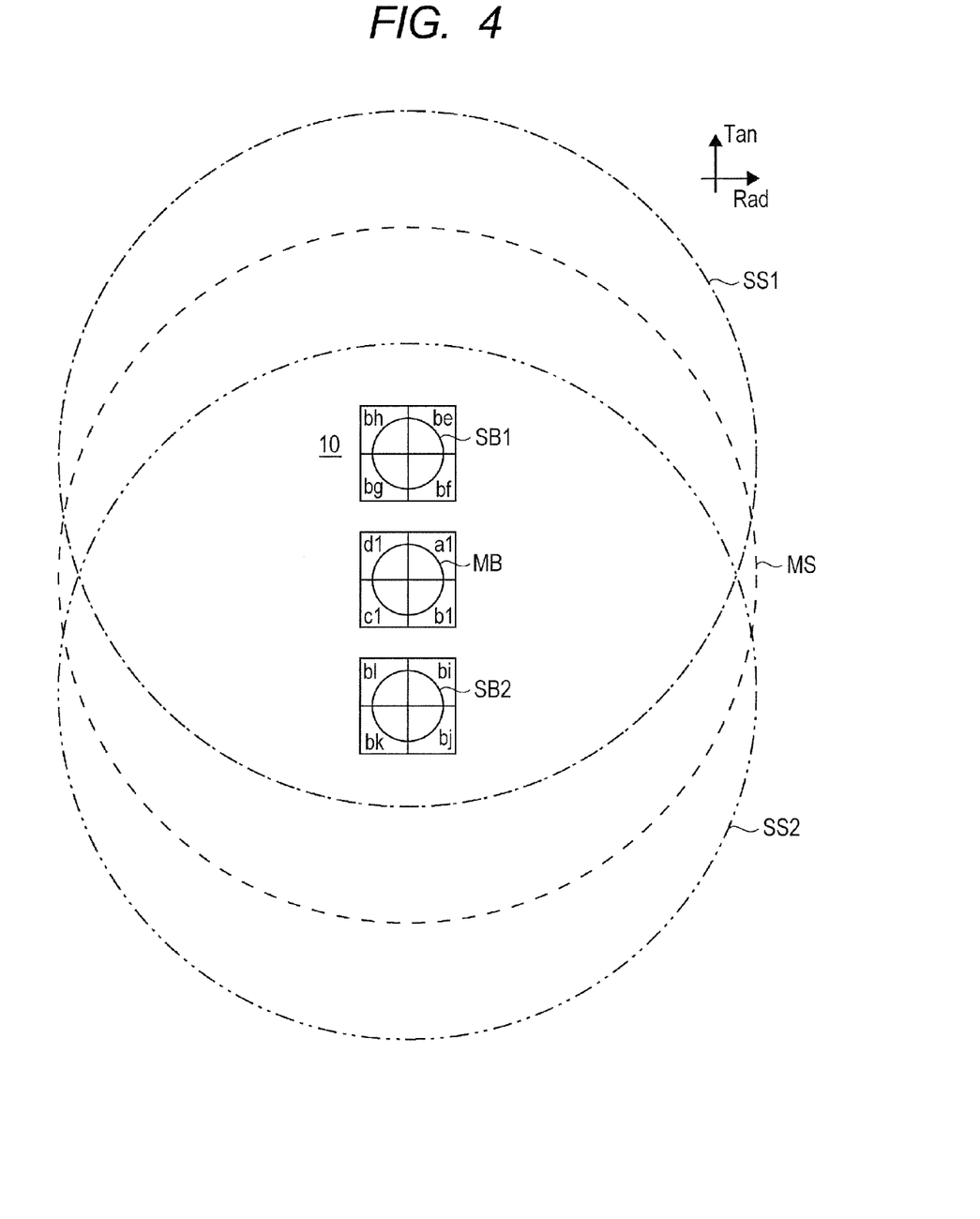
FIG. 4 is a diagram illustrating an example of a relation between signal light and stray light which are incident upon a detector.

FIG. 4 is a diagram illustrating an example of a relation between signal light and stray light which are both incident upon the detection parts of the detector. The detector 10 is irradiated with the signal light (the main beam MB, the first sub beam SB1 and the second sub beam SB2 are included) which has been reflected from a target recording layer and also with stray light (main beam stray light MS, first sub beam tray light SS1 and second sub beam stray light SS2 are included) which has been reflected from recording layers other than the target layer. Here, for example, since respective rays of stray light (MS, SS1 and SS2) are incident upon the four-divided detection part (divided into the regions a1, b1, c1 and d1) in addition to the main beam MB in the signal light, interference occurs between the beams MB and MS, the beams MB and SS1, the beams MB and SS2, the beams MS and SS1 and the beams MS and SS2. In addition, the interference also occurs on the four-divided detection part that receives the first and second sub beams SB1 and SB2.

Here, since the interference state may not change unless a phase difference between the optical beams that interfere with each other changes, a change in quantity of light is not observed and hence the tracking error signal does not fluctuate. However, since the phase difference changes with time in reality, the interference state also changes with time to induce fluctuation of the tracking error signal. The main cause of occurrence of this time-dependent change in phase difference lies in the configuration of a disc used. Specifically, when an inter-layer space between Layer 0 and Layer 1 which are recording layers of the disc is changed, the phase of each optical beam also changes accordingly. As another cause, the phase of the optical beam changes with tilting the disc.

Next a relation between the optical magnification from disc to detector and the fluctuation amount of the tracking error signal will be described. First, the outer diameter of the stray light (including the main beam stray light MS, the first sub beam stray light SS1 and the second sub beam stray light SS2) depends on the optical magnification from disc to detector. That is, the larger the optical magnification from disc to detector is, the more the outer diameter of the stray light is increased. Thus, from the viewpoint of the quantity of the stray light that the detection part receives, it is thought that when the optical magnification from disc to detector is increased, the quality of the stray light is rather decreased and hence the fluctuation of the tracking error signal is decreased accordingly. However, the actual result is different from the above. It is thought that the reason therefor lies in that since the phase of the optical beam which is incident upon the detector is not constant within the optical beam, the tracking error signal fluctuates depending on the phase distribution within the optical beam. The phase greatly varies depending on its position within the optical beam, in particular, with respect to the stray light.

Since the outer diameter of the stray light is increased when the optical magnification from disc to detector is increased, a phase change amount is small when it is considered on the detection part. As a result, rough (large) interference fringes generate in the optical beam on the detection part. On the other hand, since the outer diameter of the stray light is decreased when the optical magnification from disc to detector is decreased, the phase change amount is increased when it is considered on the detection part. As a result, fine (small) interference fringes generate in the optical beam on the detection part. When the above mentioned results are compared with each other, since the finer (smaller) the interference fringes are, the more they are liable to be averaged in the detection part, the fluctuation amount is decreased. In particular, since the tracking error signal is a differential signal of the signals on the detection part, a difference in roughness of the interference fringes is liable to appear in the tracking error signal.

However, too much reduction of the optical magnification from disc to detection may lead to an increase in quantity of the stray light that the detection part receives and hence a difference in quantity of light is increased regardless of the fine interference fringes. As a result, the fluctuation of the tracking error signal may be increased. Therefore, the optical magnification from disc to detector (about 12×) at which the fluctuation amount is minimized is present and a tendency that the fluctuation amount is increased on the both sides with this minimum point interposed between them is observed as illustrated in FIG. 3. The above mentioned mechanism of the fluctuation of the tracking error signal has not been made clear so far and the optical magnification at which the amount of fluctuation in association with the interference of the stray light is minimized has not been clarified too.

For reasons as mentioned above, according to the embodiment 1, it is allowed to generate the stable tracking error signal by decreasing the optical magnification from disc to detector to about 10× to 15× which are sufficiently smaller than the ever attained values in detection of the tracking error signal generated by the Differential-Push-Pull (DPP) method. In the above mentioned case, since such a complicated configuration as that in Japanese Patent Application Laid-Open No. 2006-344344 and Japanese Patent Application Laid-Open No. 2004-281026 (and in Technical Report CPM 2005-149, October 2005, p. 33, published from the Institute of Electronics, Information and Communication Engineers) is not used, the size of the optical pickup device is not increased and hence it is also advantageous from the viewpoint of cost. The size of the optical system is rather decreased with decreasing the optical magnification from disc to detector and hence it is allowed to attain size reduction of the optical pickup device. In addition, since the sizes of the detection part and the light spot are equal to those of the existing ones in FIG. 3 illustrated in relation to the embodiment 1, positional displacement of the detector and deterioration of reproducing performance may occur as ever.

Embodiment 2

Figure 5:
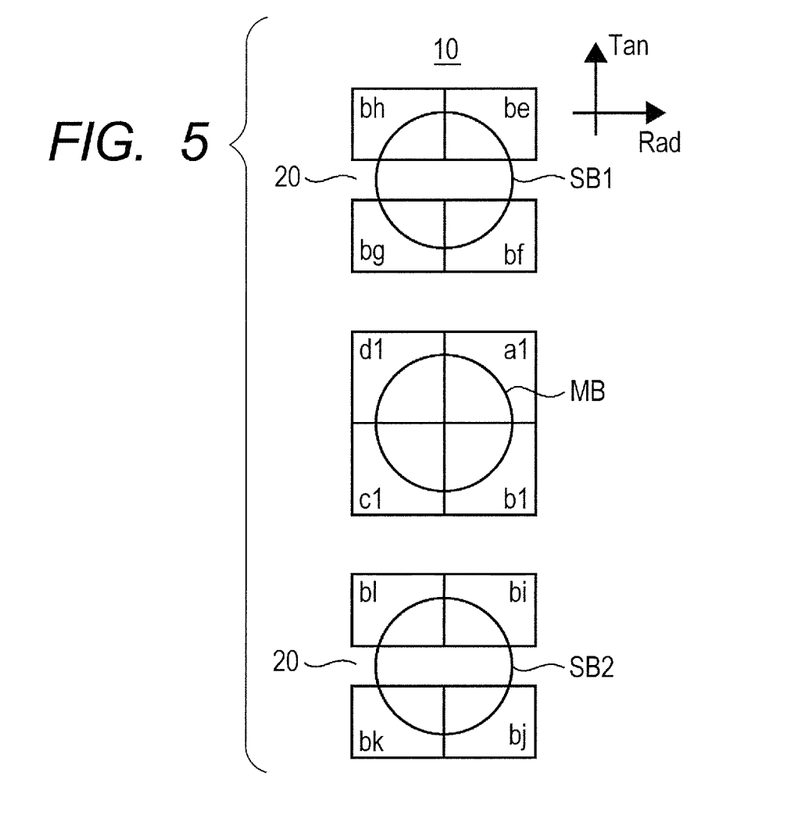
FIG. 5 is a diagram illustrating examples of detection parts of a detector of an optical pickup device according to an embodiment 2.

FIG. 5 is a diagram illustrating examples of the detection parts of the detector 10 of the optical pickup device according to the embodiment 2 of the present invention. The embodiment 2 is different from the embodiment 1 (FIG. 2) in that a light shielding zone 20 is installed on a central part of each of the detection parts for the first and second sub beams SB1 and SB2 on the detector 10. Others are configured in the same manner as those in the embodiment 1 and hence description thereof will be omitted. The light shielding zone 20 extends in the radius direction of the disc across a predetermined width to intercept the first or second sub beam SB1 or SB2 which is incident upon the region concerned. As a result, the signals BE, BF, BG, BH, BI, BJ, BK and BL which are obtained from the respective regions be, bf, bg, bh, bi, bj, bk and bl are changed influenced by the light shielding zones 20. The RF signal (RF), the tracking error signal (TES) and the focusing error signal (FES) are generated from the above mentioned signals by calculating the arithmetic expressions (1) and (2).

The embodiment 2 is configured to make the optical magnification from the disc to the detector 10 of the optical system greatly smaller than ever as in the embodiment 1. However, the optimum value of the optical magnification from disc to detection changes owing to provision of the light shielding zone 20 on the detection part of the detector 10.

Figure 6:
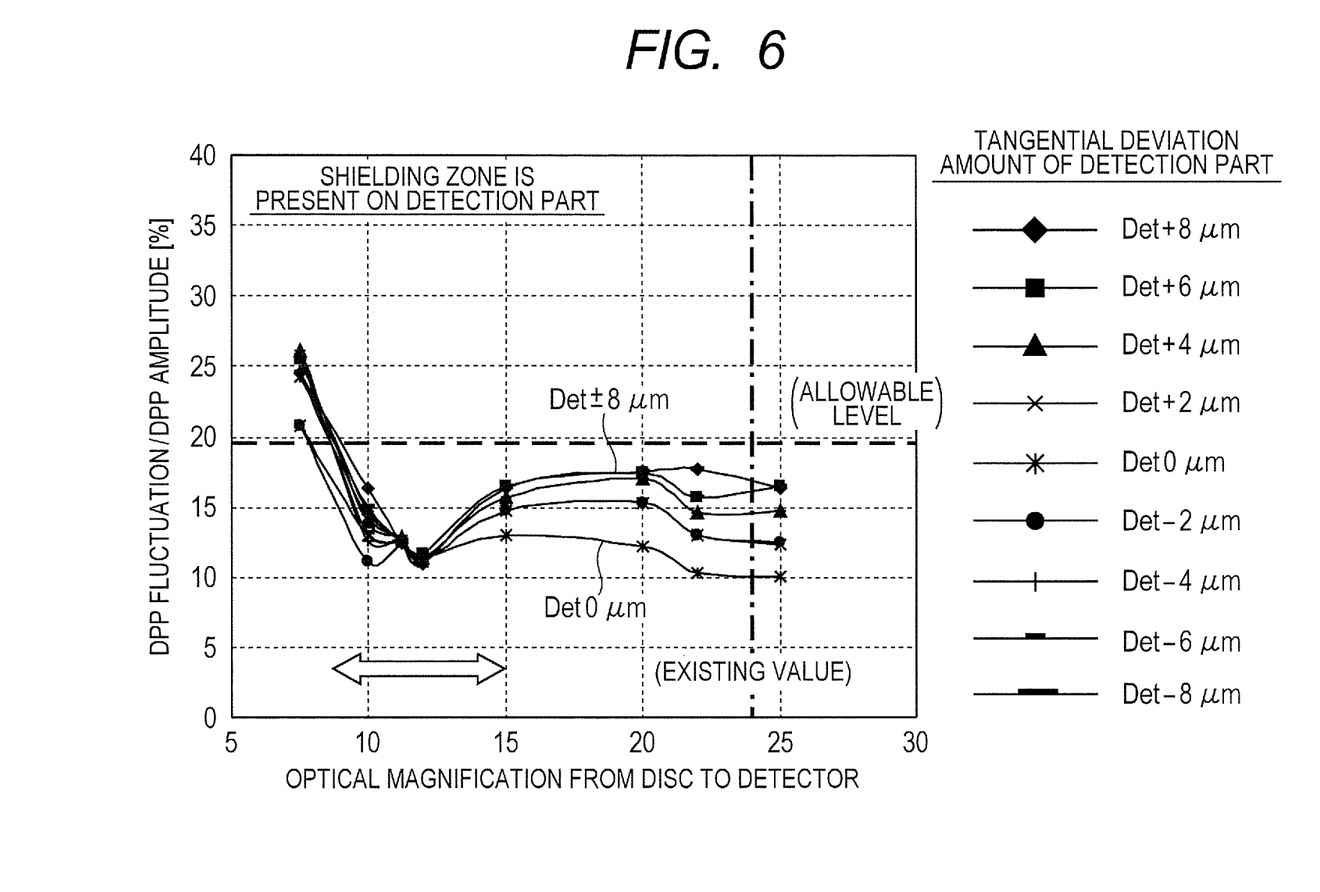
FIG. 6 is a diagram illustrating an example of dependency of a fluctuation amount of a tracking error signal on an optical magnification from disc to detector when a light shielding zone is installed.

FIG. 6 is a diagram illustrating an example of dependency of the fluctuation amount of the tracking error signal on the optical magnification from disc to detector when the light shielding zone is installed. That is, as in the case in the embodiment 1 (FIG. 3), it illustrates an example of a result of simulation of a relation between the fluctuation amount of the Differential-Push-Pull (DPP) signal and the optical magnification from disc to detectors in information reproduction from the Layer 0 of the dual layer disc. Here, the detection part illustrated in FIG. 5 is deviated in the tangential (Tan) direction within the range from +8 μm to −8 μm and symbols Det+8 μm to Det−8 μm denote the fluctuation amounts obtained in the above mentioned range. In this simulation, calculations were performed by using optical parameters in Table 2. It is different from the embodiment 1 (Table 1) in that the light shielding zones of 37 μm in width are disposed on the detection parts of the detector.

TABLE 2

Optical Parameters for Simulation (Embodiment 2)

| | |
|---|---|
| Laser Wavelength | 405 nm |
| Diffraction Efficiency of Grating 11 | (Zero-Order Diffracted Light): (Plus/Minus First Order Diffracted Light) = 15:1 |
| Reflectance of Disc | (Reflectance of Layer 0)/ (Reflectance of Layer 1) = 1 |
| Focal Distance of Objective Lens | 1.76 mm |
| Numerical Aperture (NA) | 0.85 |
| Diameter of Light Spot on Detection Part of Detector | 60 μm |
| Light Shielding Zone on Detection Part of Detector | 37 μm |
| Size of Detection Part of Detector | 120 μm × 120 μm |
| Space between Detection Parts of Detector (Distance between Main and Sub Beams) | 153 μm |

In addition, when the optical magnification from disc to detector is changed, the grating pitch of the grating 11 is changed to adjust such that the sub beams SB1 and SB2 are incident upon the detection parts for sub beams and to change the detection range such that the light spot of the same size as the previous one is directed onto the detector 10.

FIG. 6 indicates that the fluctuation of the tracking error signal is also decreased by making the optical magnification from disc to detector smaller than the ever attained value (24×) regardless of installation of the light shielding zone. The reason for a reduction in fluctuation amount is the same as that in the embodiment 1. However, the range of the optimum optical magnifications from disc to detector is expanded to a range from about 8× to 25× (indicated by an arrow) for the permissible value of the fluctuation amount of the tracking error signal which is not more than 19.2%. Then, the optical magnification from disc to detector which is within a range from about 8× to 15× may be good enough to be made more favorable than that (the optical magnification from disc to detector:24×) of the existing optical system in consideration of the positional displacement which would occur within this range. Owing to the above, in the embodiment 2 in which the light shielding zone is installed on the detection part of the detector, it is allowed to obtain the significant effect by setting the optical magnification within the range from about 8× to 15×.

Here, the fluctuation amount of the tracking error signal is more reduced in the embodiment 2 (FIG. 6) when the result (FIG. 6) of the embodiment 2 is compared with the result (FIG. 3) of the embodiment 1. Next, reasons for improvement obtained when the light shielding zone is installed on the central part of the sub beam detection part will be described.

In general, the intensity of the sub beam is reduced to about 1/20 to 1/10 of the intensity of the main beam so as not to erase a recorded mark in recording. Then, in the optical pickup device and the optical disc apparatus, a signal detected with the sub beam is multiplied by a predetermined number and is output. Thus, when the sub beam fluctuates under the influence of interference, a fluctuation portion thereof is also multiplexed by the predetermined number and hence the fluctuation amount of the sub beam exceeds that of the main beam. In addition, since the change in phase is little at a central part of the light spot, coarse (large) interference fringes generate on a central part of the detection part. On the other hand, it is allowed to effectively suppress the fluctuation of the sub beam the fluctuation amount of which is liable to increase by installing the light shielding zone on the central part of the sub beam detection part as in the embodiment 2.

For reasons as mentioned above, it is allowed to generate the stable tracking error signal by setting the optical magnification from disc to detector within the range from about 8× to 15× which are greatly smaller than ever attained values in detection of the Differential-Push-Pull (DPP) method-based tracking error signal in the embodiment 2. In the above mentioned case, since such a complicated configuration as in Japanese Patent Application Laid-Open No. 2006-344344 and Japanese Patent Application Laid-Open No. 2004-281026 (and Technical Report CPM 2005-149, October 2005, p. 33, published from the Institute of Electronics, Information and Communication Engineers) is not used, the size of the optical pickup device is not increased and hence it is advantageous from the viewpoint of cost. The size of the optical system is rather decreased with decreasing the optical magnification from disc to detector and hence it is allowed to attain size reduction of the optical pickup device.

Although description has been made on the assumption that the dual layer disc is used in the above mentioned embodiments 1 and 2, it is also allowed to suppress the fluctuation of the tracking error signal even when a multilayer disc that includes two or more layers is used. In addition, although description has been made on the assumption that only the BD optical system is used as the optical system in FIG. 1, it may be combined with optical systems of a DVD and a CD. In addition, the detection part of the BD may be commonly used as the detection parts of the DVD and the CD.

Since the embodiments 1 and 2 aim to reduce the fluctuation of the tracking error signal by appropriately setting the optical magnification from disc to detector, the pattern of the grating 11 and other optical components may be different from those illustrated in FIG. 1. In addition, since the operation of each embodiment depends on the relation between the signal light and the stray light and the optical magnification from disc to detector, it does not depend on the size of the detection part. Incidentally, although description has been made on the assumption that three kinds of beams are used in each of the embodiments, the same effect as the above may be obtained even when one main beam and two or more sub beams are generated. Further, in the embodiment 1, the same effect may be obtained even when no sub beam is generated and only the main beam is generated. Incidentally, since the focusing error signal generated by the astigmatic method is not an interference signal such as the tracking error signal and a servo signal is generated in accordance with a change in shape of the light spot, any disadvantage caused by interference may not occur.

Embodiment 3

In the embodiment 3, an optical disc apparatus loaded with the optical pickup device 170 according to the embodiment 1 or 2 will be described.

Figure 7:
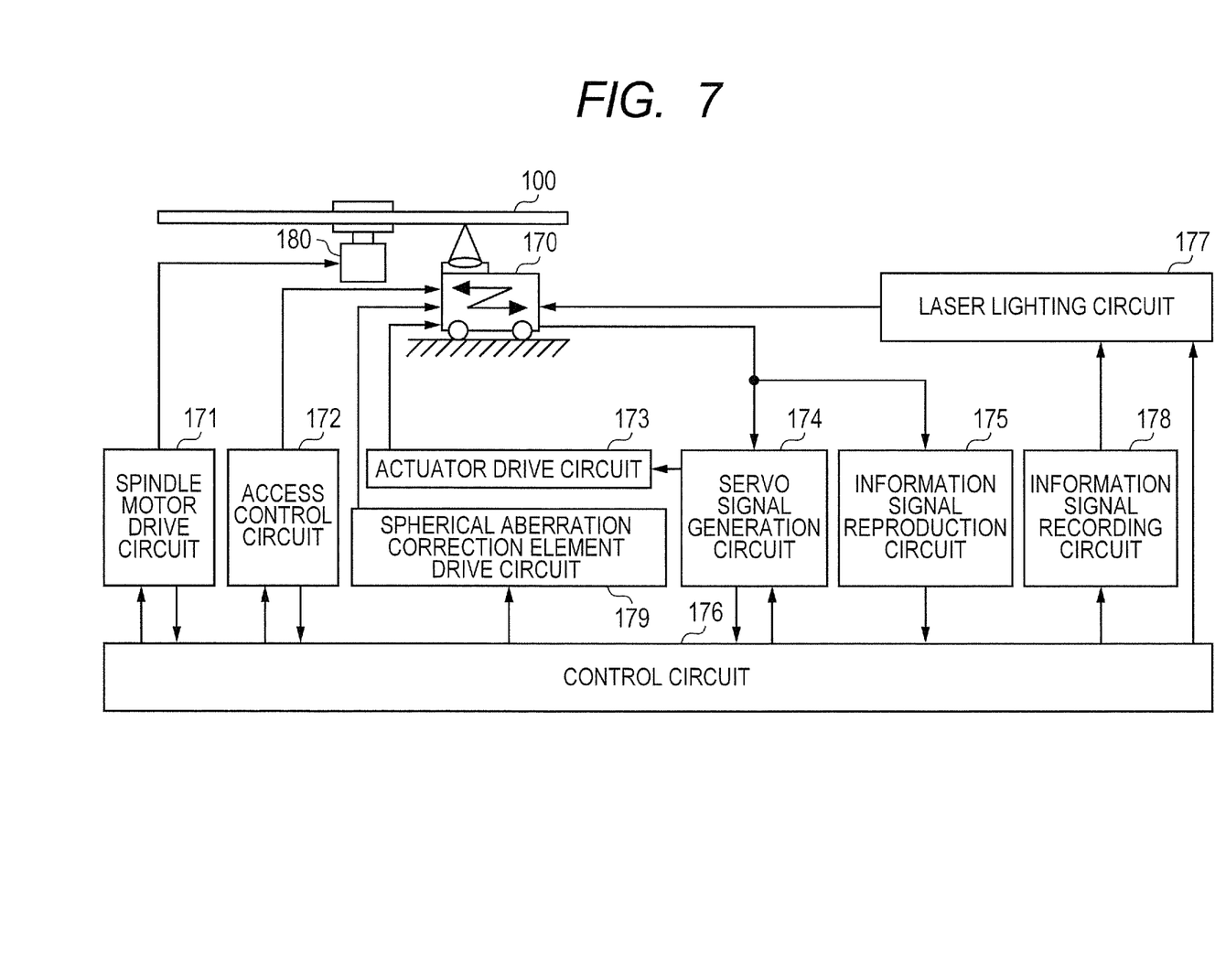
FIG. 7 is a diagram illustrating a rough configuration example of an optical disc apparatus according to an embodiment 3.

FIG. 7 is a diagram illustrating a rough configuration example of the optical disc apparatus according to the embodiment 3. The optical pickup device 170 may have any one of the configurations of the embodiments 1 and 2. An optical disc 100 is rotated by a spindle motor 180 and is irradiated with laser light from the optical pickup device 170 to record information thereon and reproduce information therefrom. The optical pickup device 170 includes a mechanism that moves in a radius direction (Rad direction) of the optical disc 100 and is positioned in accordance with a control signal from an access control circuit 172.

A laser lighting circuit 177 supplies a predetermined laser drive current to the laser diode 50 in the optical pickup device 170 and a predetermined quantity of laser light is emitted from the laser diode 50 depending on whether recording or reproduction is performed. Incidentally, the laser lighting circuit 177 may be incorporated into the optical pickup device 170.

A signal output from the detector 10 in the optical pickup device 170 is sent to a servo signal generation circuit 174 and an information signal reproduction circuit 175. The servo signal generation circuit 174 performs arithmetic operations using a detection signal from the detector 10 to generate servo signals such as a tracking control signal, a focusing control signal, a tilting control signal and the like. An actuator drive circuit 173 drives the actuator 5 in the optical pickup device 170 on the basis of the servo signal to control the position of the objective lens 2.

The information signal reproduction circuit 175 generates a signal used for reproduction of information which is recorded on the optical disk 100 on the basis of the detection signal (the RF signal) from the detector 10 and sends it to a control circuit 176. An information signal recording circuit 178 generates a recording control signal on the basis of information received from the control circuit 176 and controls the laser lighting circuit 177 to record desirable information on the optical disc 100.

Some of the signals generated by the servo signal generation circuit 174 and the information signal reproduction circuit 175 are sent to the control circuit 176. The control circuit 176 commands a spindle motor drive circuit 171, the access control circuit 172, the servo signal generation circuit 174, the laser lighting circuit 177, and a spherical aberration correction element drive circuit 179 to perform rotation control of the spindle motor 180, access position control of the optical pickup device 170, servo control of the objective lens 2, control of the quantity of light emitted from the laser diode 50, and correction of spherical aberration.

According to the optical disc apparatus of the embodiment 3, when information is to be recorded on and reproduced from the optical disc that includes the plurality of recording layers, it is allowed to perform stable recording and reproducing operations by suppressing the fluctuation of the servo signal caused by the stray light. The same thing may also apply even when the optical disc apparatus is exclusively used for information reproduction.

Incidentally, the present invention is not limited to the respective embodiments described above and various modification examples are included therein. For example, the above mentioned embodiments have been described in detail for ready explanation of the present invention and are not necessarily limited to those that include all the configurations described above. In addition a part of a configuration of one embodiment may be replaced with a configuration of another embodiment. Further, a configuration of another embodiment may be added to a configuration of one embodiment. Still further, another configuration may be added to, deleted from and replaced with a part of one configuration of each embodiment.

What is claimed is:

1. An optical pickup device that records or reproduces information by irradiating an optical disc with laser light, comprising:
    a laser diode emitting laser light of about 405 nm in wavelength;
    a grating branching an optical beam emitted from the laser diode into at least a main beam and two sub beams;
    an objective lens irradiating the optical disc with an optical beam branched by the grating and having a numerical aperture of about 0.85;
    a detector including a detection part that receives the optical beam reflected from the optical disc, and
    a detecting lens giving astigmatism to the optical beam which is incident upon the detector,
    wherein
    each of the detection parts of the detector is divided into a plurality of regions,
    a focusing error signal is generated by an astigmatic method on the basis of a detection signal from each of the divided regions,
    a tracking error signal is generated by a Differential-Push-Pull method on the basis of a detection signal from each of the divided regions, and
    an optical magnification from the optical disc to the detector is set within a range larger than 10.5× and smaller than 13.5×.

2. The optical pickup device according to claim 1, wherein the detector includes detection parts that respectively receive the main beam and the two sub beams reflected from the optical disc.

3. An optical disc apparatus loaded with the optical pickup device according to claim 1, comprising:
    a laser lighting circuit driving the laser diode in the optical pickup device;
    a servo signal generation circuit generating servo signals such as a tracking control signal and a focusing control signal by using signals detected by the detector in the optical pickup device; and
    an information signal recording circuit or an information signal reproduction circuit recording or reproducing an information signal on or from the optical disc via the optical pickup device.

4. The optical disc apparatus according to claim 3, further comprising:
    a second laser diode emitting laser light of a second wavelength different from 405 nm;
    wherein the detector receives laser light from the second laser diode.

5. The optical disc apparatus according to claim 3, further comprising:
    a second laser diode emitting laser light of a second wavelength different from 405 nm; and
    a second grating branching an optical beam emitted from the second laser diode into a main beam and sub beam;
    wherein the detector receives the main beam and sub beam of second wavelength.

6. An optical pickup device that records or reproduces information by irradiating an optical disc with laser light, comprising:
    a laser diode emitting laser light of about 405 nm in wavelength;
    a grating branching an optical beam emitted from the laser diode into at least a main beam and two sub beams;
    an objective lens irradiating the optical disc with the optical beams branched by the grating and having a numerical aperture of about 0.85;
    a detector including a detection part that receives the optical beam reflected from the optical disc, and
    a detecting lens giving astigmatism to the optical beam which is incident upon the detector,
    wherein
    each of the detection parts of the detector is divided into a plurality of regions, a focussing error signal is generated by an astigmatic method on the basis of a detection signal from each of the divided regions, a tracking error signal is generated by a Differential-Push-Pull method on the basis of a detection signal from each of the divided regions, the detector includes detection parts that respectively receive the main beam and the two sub beams, a light shielding zone extending in a radius direction of the disc to shield incident light across a predetermined width is installed on a central part of each of the two detection parts that detect the two sub beams, and an optical magnification from the optical disc to the detector is set within a range larger than 8× and smaller than 15×.

7. An optical pickup device that records or reproduces information by irradiating an optical disc with laser light, comprising:

a laser diode emitting laser light of about 405 nm in wavelength;

a grating branching an optical beam emitted from the laser diode into a main beam and sub beam;

an objective lens irradiating the optical disc with optical beams branched by the grating and having a numerical aperture of about 0.85;

a detector that receives the optical beams reflected from the optical disc, and a detecting lens giving astigmatism to optical beams that is incident upon the detector, wherein a focusing error signal is generated by an astigmatic method on the basis of a detection signal from the detector, a tracking error signal is generated by a Differential-Push-Pull method on the basis of a detection signal from the detector, and an optical magnification from the optical disc to the detector is set within a range larger than 10.5× and smaller than 13.5×.

8. An optical disc apparatus loaded with the optical pickup device according to claim 7, comprising:

a laser lighting circuit driving the laser diode in the optical pickup device;

a servo signal generation circuit generating servo signals such as a tracking control signal and a focusing control signal by using signals detected by the detector in the optical pickup device; and an information signal recording circuit or an information signal reproduction circuit recording or reproducing an information signal on or from the optical disc via the optical pickup device.

9. An optical pickup device that records or reproduces information by irradiating an optical disc with laser light, comprising:

a laser diode emitting laser light of about 405 nm in wavelength;

a grating branching an optical beam emitted from the laser diode into a main beam and sub beam;

an objective lens irradiating the optical disc with the optical beams branched by the grating and having a numerical aperture of about 0.85;

a detector that receives the optical beams reflected from the optical disc, and a detecting lens giving astigmatism to optical beams that is incident upon the detector, wherein a focusing error signal is generated by an astigmatic method on the basis of a detection signal from the detector, a tracking error signal is generated by a Differential-Push-Pull method on the basis of a detection signal from the detector, the detector includes detection parts that respectively receive the main beam and the sub beam, a light shielding zone extending in a radius direction of the optical disc to shield incident light across a predetermined width is installed on a central part of the detection part that detect the sub beam, and an optical magnification from the optical disc to the detector is set within a range larger than 8× and smaller than 15×.

10. An optical disc apparatus loaded with the optical pickup device according to claim 8, comprising:

a laser lighting circuit driving the laser diode in the optical pickup device;

a servo signal generation circuit generating servo signals such as a tracking control signal and a focusing control signal by using signals detected by the detector in the optical pickup device; and an information signal recording circuit or an information signal reproduction circuit recording or reproducing an information signal on or from the optical disc via the optical pickup device.

11. An optical pickup device that records or reproduces information by irradiating an optical disc with laser light, comprising:

a laser diode emitting laser light of about 405 nm in wavelength; a grating branching an optical beam emitted from the laser diode into a main beam and sub beam;

an objective lens irradiating the optical disc with the optical beams branched by the grating and having a numerical aperture of about 0.85;

a detector that receives the optical beams reflected from the optical disc, and a detecting lens giving astigmatism to the optical beams that is incident upon the detector, wherein a focusing error signal is generated by an astigmatic method on the basis of a detection signal from the detector, a tracking error signal is generated by a Differential-Push-Pull method on the basis of a detection signal from the detector, the detector includes detection parts that respectively receive the main beam and the sub beam, the detection part of the sub beam has a zone extending in a radius direction of the optical disc not to detect incident light including central portion of the sub beam across a predetermined width, and an optical magnification from the optical disc to the detector is set within a range larger than 8× and smaller than 15×.

12. An optical disc apparatus loaded with the optical pickup device according to claim 11, comprising:

a laser lighting circuit driving the laser diode in the optical pickup device;

a servo signal generation circuit generating servo signals such as a tracking control signal and a focusing control signal by using signals detected by the detector in the optical pickup device; and an information signal recording circuit or an information signal reproduction circuit recording or reproducing an information signal on or from the optical disc via the optical pickup device.

13. An optical pickup device that records or reproduces information by irradiating an optical disc with laser light, comprising:
- a laser diode emitting laser light of about 405 nm in wavelength; a grating branching an optical beam emitted from the laser diode into a main beam and sub beam;
- an objective lens irradiating the optical disc with the optical beams branched by the grating and having a numerical aperture of about 0.85;
- a detector that receives the optical beams reflected from the optical disc, and
- a detecting lens giving astigmatism to optical beams that is incident upon the detector, wherein
- a focusing error signal is generated by an astigmatic method on the basis of a detection signal from the detector,
- a tracking error signal is generated by a Differential-Push-Pull method on the basis of a detection signal from the detector,
- the detector includes detection parts that respectively receive the main beam and the sub beam,
- the detection part of the sub beam has a zone extending in a radius direction of the optical disc and having a predetermined width, a sub beam detected by the zone being not used to generate the focusing error signal and the tracking error signal, and
- an optical magnification from the optical disc to the detector is set within a range larger than 8× and smaller than 15×.

14. An optical disc apparatus loaded with the optical pickup device according to claim 13, comprising:
- a laser lighting circuit driving the laser diode in the optical pickup device;
- a servo signal generation circuit generating servo signals such as a tracking control signal and a focusing control signal by using signals detected by the detector in the optical pickup device; and
- an information signal recording circuit or an information signal reproduction circuit recording or reproducing an information signal on or from the optical disc via the optical pickup device.

* * * * *